United States Patent [19]

Nomoto

[11] Patent Number: 5,717,682
[45] Date of Patent: Feb. 10, 1998

[54] OPTICAL DISK HAVING INFORMATION PITS OF DIFFERENT LENGTHS AND SHAPES

[75] Inventor: Takayuki Nomoto, Tsurugashima, Japan

[73] Assignee: Pioneer Electronic Corporation, Tokyo-to, Japan

[21] Appl. No.: 594,787

[22] Filed: Jan. 31, 1996

[30] Foreign Application Priority Data

Feb. 1, 1995 [JP] Japan .................. 7-015431

[51] Int. Cl.$^6$ .................................................. G11B 7/24
[52] U.S. Cl. ........................... 369/275.4; 369/275.1
[58] Field of Search .......................... 369/275.4, 275.1, 369/275.2, 276, 277, 272, 284; 430/320, 321

[56] References Cited

U.S. PATENT DOCUMENTS

| | | | |
|---|---|---|---|
| 5,331,623 | 7/1994 | Matoba et al. | 369/275.4 |
| 5,331,626 | 7/1994 | Sugiura | 369/275.4 |
| 5,337,301 | 8/1994 | Sugiura et al. | 369/275.4 |
| 5,339,304 | 8/1994 | Hanaoka | 369/275.4 |
| 5,357,499 | 10/1994 | Nomoto | 369/275.4 |
| 5,359,591 | 10/1994 | Nomoto | 369/275.4 |
| 5,459,712 | 10/1995 | Sugaya et al. | 369/275.4 |
| 5,467,339 | 11/1995 | Nakajima et al. | 369/275.4 |

*Primary Examiner*—Tan Dinh
*Attorney, Agent, or Firm*—Young & Thompson

[57] ABSTRACT

An optical disk includes: an information recording surface on which a laser light is irradiated; and information pits arranged on the information recording surface and including a plurality of shapes each corresponding to information to be recorded, each of the shapes having different lengths in at least one of a radial direction of the disk and a circumferential direction of the disk and a depth d substantially satisfying the following relationship with a wavelength $\lambda$ of the laser light:

$$d = (2n+1) \cdot \lambda/4 \quad (n: \text{integer}).$$

7 Claims, 10 Drawing Sheets

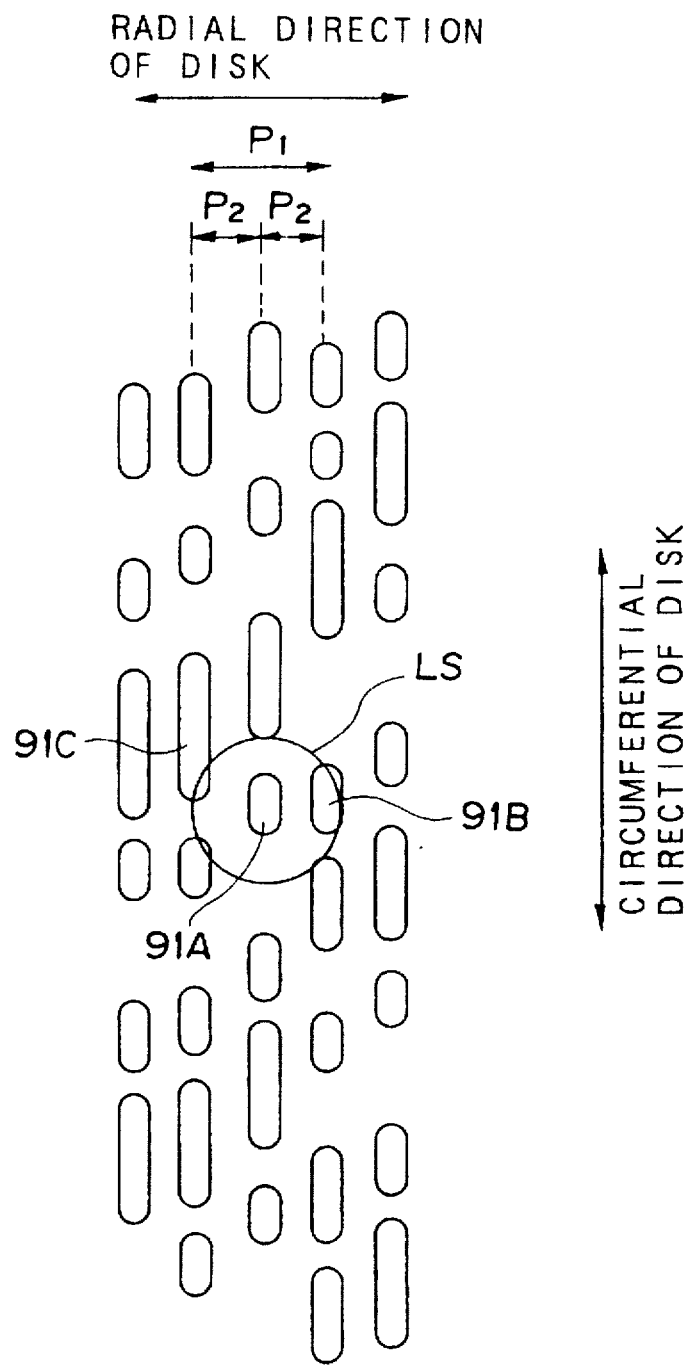

FIG. 7

|  | I2>TL | I2<TL |
|---|---|---|
| I1>TL | ABSENCE | VERTICALLY ELONGATED |
| I1<TL | LATERALLY ELONGATED | SQUARE |

|  | $I2 > TL1$ | $TL1 > I2 > TL2$ | $TL2 > I2$ |
|---|---|---|---|
| $I1 > TL1$ | α | β | γ |
| $TL1 > I1 > TL2$ | γ | ε | ζ |
| $TL2 > I1$ | η | θ | ι |

OPTICAL DISK HAVING INFORMATION PITS OF DIFFERENT LENGTHS AND SHAPES

BACKGROUND OF THE INVENTION

1. Field of the Invention

The present invention relates to an optical disk and a device for reproducing information from the same, and more particularly to an optical disk formed with information pits each containing multi-bits information.

2. Description of the Prior Art

FIG. 1 illustrates a configuration of a known optical disk on which audio information and/or video information is recorded. Information to be recorded is converted into signals corresponding to the pit lengths, and the signals are recorded on the information recording surface 95 of the optical disk 92 in the form of the information pits 91. In reproduction, a laser light is irradiated on the information recording surface 95 so that the information pit 91 is covered with the light spot LS having a predetermined diameter, and a reflected and diffracted light beam is detected by a photodetector, such as a photodiode, to produce a read-out electric signal. The reproduction device extracts and decodes the audio and/or video information from the electric signal, and outputs it. In FIG. 1, the reference numeral 93 indicates a substrate and the reference numeral 94 indicates a protection layer. As an example of such an optical disk, there are known a Compact Disk (CD) and an optical video disk. The information recording density of the optical disk is limited by a track pitch. As shown in FIG. 2, the track pitch ($P_1$) is an interval between neighboring tracks which serve as the center-lines of the columns of the information pits 91. Recently, in order to improve the recording density of the optical disk, various measures have been taken.

A first measure for the improvement of the recording density is to reduce the track pitch. However, the simple reduction of the track pitch may result a drawback. Namely, when the track pitch is simply reduced to the value $P_2$ smaller than conventional value $P_1$ (e.g., $P_2=P_1/2$) as illustrated in FIG. 3, the light spot LS covers not only the information pit 91A on the target track to be read-out but also the information pits 91B and 91C on both neighboring tracks. Therefore, the read-out signal includes a crosstalk component (intermixture of signals from the neighboring tracks) too much. In this view, in order to reduce the crosstalk, the track pitch is required be large enough in comparison with the diameter of light spot LS. Namely, the crosstalk becomes a bar against increasing recording density by the reduction of the track pitch.

A second measure for the recording density improvement is to reduce the size of the light spot of the laser beam. In general, the radius W of the light spot LS is prescribed as follows:

$$W=\alpha \times (\lambda/NA) \ (\alpha: \text{constant}),$$

where NA is the numerical aperture of the objective lens and λ is the wavelength of the laser light. Accordingly, in order to reduce the radius W of the laser light, the wavelength λ should be reduced, or alternatively the numeral aperture NA should be increased. However, the wavelength λ may be reduced to be half at the utmost, and the numerical aperture NA may be increased 10% at the utmost. Therefore, it is hopeless to improve recording density greatly by this second measure.

As a third measure, it has been proposed a method for improving recording density in which multiple (more than three) information are expressed by a unique information pit (disclosed in Japanese Patent Application No. 03-187746 and U.S. patent application Ser. No. 07/998,056). According to this method, the shapes of the information pits are recognized by a pattern recognition utilizing a diffraction phenomenon of the light beam. However, according to the third measure, the crosstalk components mixed from the neighboring tracks and the relative deviation of the light spot position with respect to the information pit are not negligible, and hence sufficient improvement of the recording density may not be expected.

Further, a fourth measure is proposed in the Japanese Patent Application Laid-Open under No. 02-123523. In this method, the optical disk is formed with the rectangular information pits oriented toward different directions, and the laser light having linear polarization components substantially normal to each other is irradiated on the disk. The reproduction device compares the magnitude of the reflected light with a reference threshold level to obtain the multiple information recorded. According to the fourth measure, however, the reproduction device needs to produce two linear polarizations, and hence the optical system requires a complicated structure and the cost necessarily increases.

SUMMARY OF THE INVENTION

It is an object of the present invention to provide an optical disk of high recording density and a device for reproducing information therefrom.

According to one aspect of the present invention, there is provided an optical disk including: an information recording surface on which a laser light is irradiated; and information pits arranged on the information recording surface and comprising a plurality of shapes each corresponding to information to be recorded, each of the shapes having different lengths in at least one of a radial direction of the disk and a circumferential direction of the disk and a depth d substantially satisfying the following relationship with a wavelength λ of the laser light:

$$d=(2n+1)\cdot\lambda/4 \ (n: \text{integer}).$$

In accordance with the optical disk, information is recorded on the information recording surface of the optical disk in a form of information pit. The shape of the information pit corresponds to information to be recorded. The information pits have a plurality of shapes differing from each other in its lengths in the radial and/or the circumferential direction of the disk. Accordingly, a unique information pit can hold multiple information. In reproduction of the recorded information, the laser light irradiated on the information recording surface is reflected so that the reflected light includes diffracted light component. Depending upon the shape of the information pit, the intensity distribution of the diffracted light varies. Therefore, by detecting the intensity distribution, the recorded information may be recognized. In addition, since the depth of the information pit satisfies the above condition, the reflected light quantity is maximized.

According to another aspect of the present invention, there is provided a device for reproducing information from the above described optical disk, including: a laser light irradiating unit for irradiating the laser light on the information recording surface; a first detecting unit for receiving a light reflected by the information recording surface and for detecting an intensity of a first-order diffracted light component diffracted in the circumferential direction to produce a first detection signal; a first comparing unit for comparing the first detection signal with one or more threshold values; a second detecting unit for receiving the light reflected by the information recording surface and for detecting an intensity of a first-order diffracted light component diffracted in the radial direction to produce a second detection signal; a second comparing unit for comparing the second detection signal with one or more threshold values; and a determining unit for determining information recorded on the optical disk on the basis of comparison results of the first comparing unit and the second comparing unit.

In accordance with the device thus configured, the laser light irradiating unit irradiates the laser light on the information recording surface. The light reflected by the optical disk includes first-order diffracted light components at the edge portions of the light spot in both radial and circumferential direction of the disk, in addition to the directly reflected light component. The first detecting unit detects the intensity of the diffracted light component in the circumferential direction and the first comparing unit compares the detected intensity with one or more threshold values. Similarly, the second detecting unit detects the intensity of the diffracted light component in the radial direction and the second comparing unit compares the detected intensity with one or more threshold values. The determining unit determines the recorded information on the basis of the comparison results of the first and the second comparing units.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 3 is a plan view illustrating a pit arrangement of an optical disk when a track pitch is halved;

FIG. 7 is a diagram illustrating a rule used for a judgement of the shape of the information pits shown in FIG. 4A;

DETAILED DESCRIPTION OF THE PREFERRED EMBODIMENT

The preferred embodiment of the present invention will be described below with reference to the attached drawings.

Figure 1:
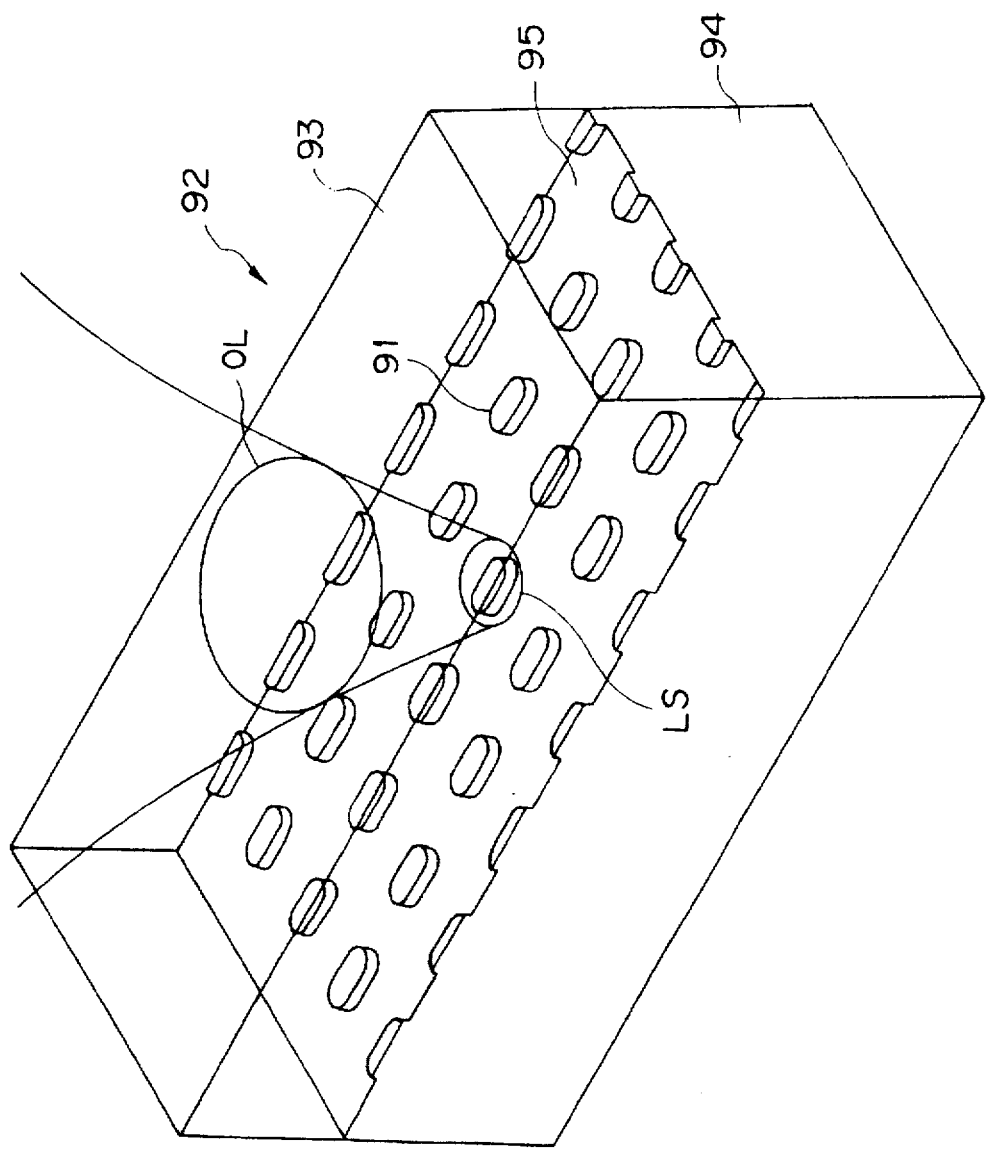
FIG. 1 is a view illustrating a configuration of a known optical disk.
Figure 2:
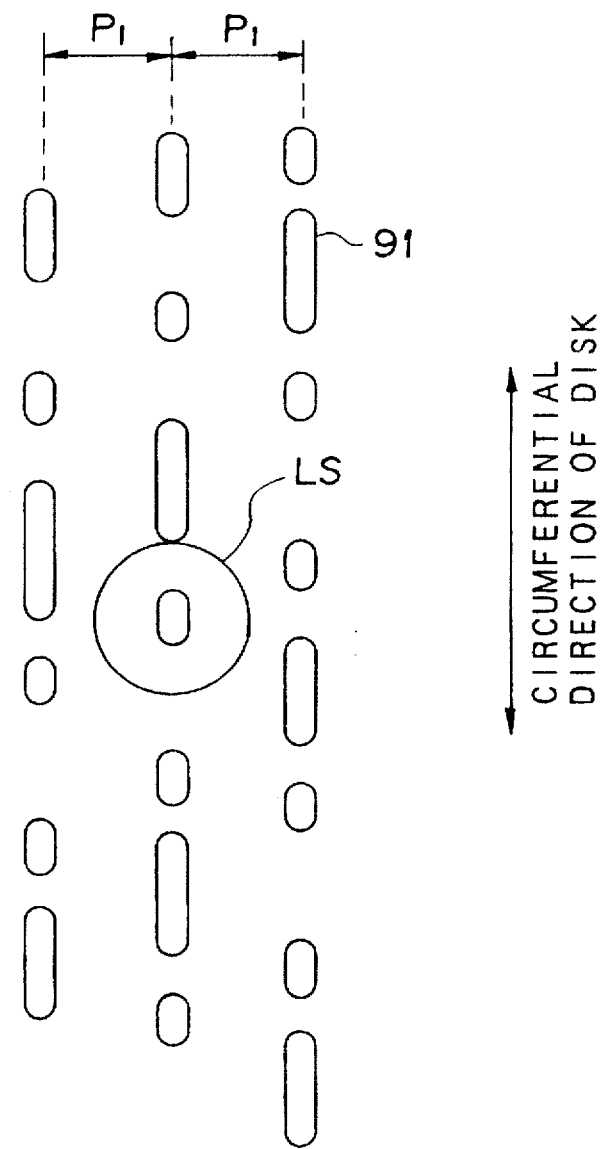
FIG. 2 is a plan view illustrating a pit arrangement of a known optical disk.
Figure 4A:
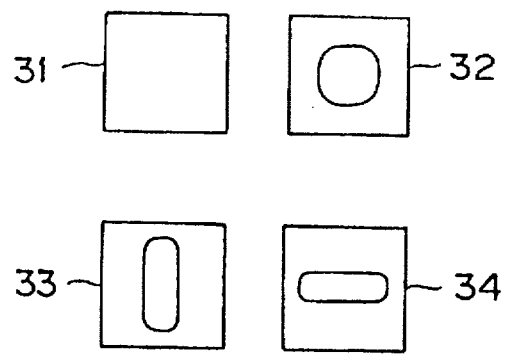
FIG. 4A is a schematic diagram illustrating shapes of four information pits each corresponding to different information.
Figure 4B:
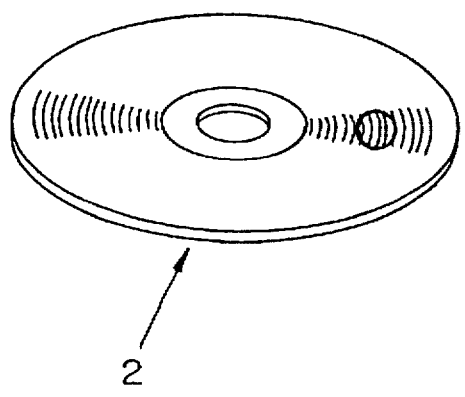
FIG. 4B is a schematic diagram illustrating an arrangement of the information pits on the optical disk according to the present invention.
Figure 4C:
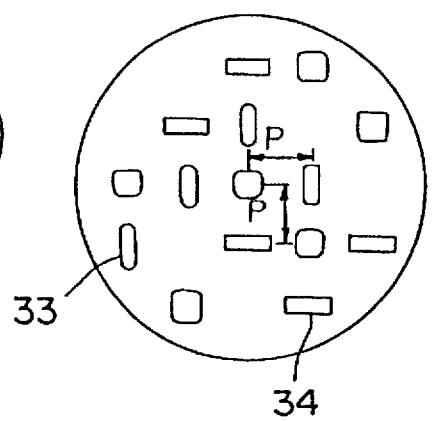
FIG. 4C is an enlarged view of the encircled portion of FIG. 4B.

FIG. 4A illustrates the shapes of four information pits each corresponding to different information, and FIG. 4B illustrates the arrangement of the information pits on the optical disk. In this embodiment, four different information is expressed by the four different shapes or arrangement manners of the information pits shown in FIG. 4A. Namely, the plain surface portion 31, the square pit 32, the vertically-elongated pit 33 and the laterally-elongated pit 34 correspond and represent different information, respectively. The plain surface portion 31 is a portion where no protruding pit shape is formed. It is possible to recognize this portion as a kind of pit which has zero length or width in both radial and circumferential directions of the disk. Namely, in this invention, the plain surface portion 31 is treated as one of the pit shapes to which an information is assigned. As seen from FIGS. 4A and 48, the vertically-elongated pit 33 is elongated in the radial direction of the optical disk 2, and the laterally-elongated pit 34 is elongated in the circumferential direction of the disk 2. These information pits are formed on the optical disk 2 in alignment on a track spirally formed, with an equal interval P therebetween in the circumferential direction of the optical disk 2. In this embodiment, it is assumed that the track pitch between the neighboring tracks is equal to the interval P of the information pits in the circumferential direction. When a read-out laser light is irradiated, the light reflected by the plain surface portion 31 provides a certain manner of light intensity distribution, and hence the plain surface portion 31 can be used as a kind of information pits as well as the deformed pits like the square pits or the elongated pits. This is because, since information is assigned to the pit shapes in this invention, it is equivalent to assigning information to the intensity distribution of the reflected light which is dependent upon the pit shape. The details of the information assignment to the pit shapes will be described later. The information pits are formed so as to have an appropriate depth for obtaining distinctive light quantity differences of the reflected light beams, for example, equal to the phase depth corresponding to the quarter of the wavelength $\lambda$ of the laser light.

Figure 8:
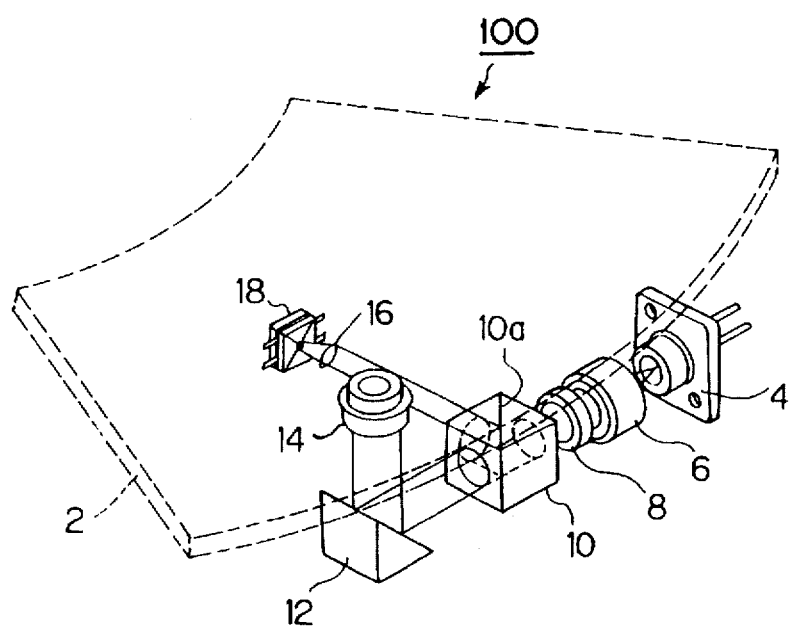
FIG. 8 is a view illustrating a configuration of a device for reproducing information from the optical disk according to the present invention.

FIG. 8 illustrates a configuration of a device for reproducing information from the optical disk according to the present invention. As illustrated in FIG. 8, the laser beam emitted by the semiconductor laser 4 is converted to a parallel beam by the collimator lens 6. Then, the laser beam is circularly polarized by the quarter wavelength plate 8 and passes through the half-mirror surface 10a of the beam-splitter 10. The passed laser light is reflected by the reflective mirror 12 and is converged upon the information recording surface of the optical disk 2 by the objective lens 14. The laser light irradiated upon the information recording surface is reflected, and the reflected light whose quantity depends upon the shape of the information pit again passes through the objective lens 14 and is reflected by the reflective mirror 12. Then, the reflected light incident upon the beam-splitter 10 is reflected to the perpendicular direction by the half-mirror surface 10a. The light reflected by the half-mirror surface 10a is collected by the cylindrical lens 16 to be irradiated upon the photodetector 18.

Figure 9:
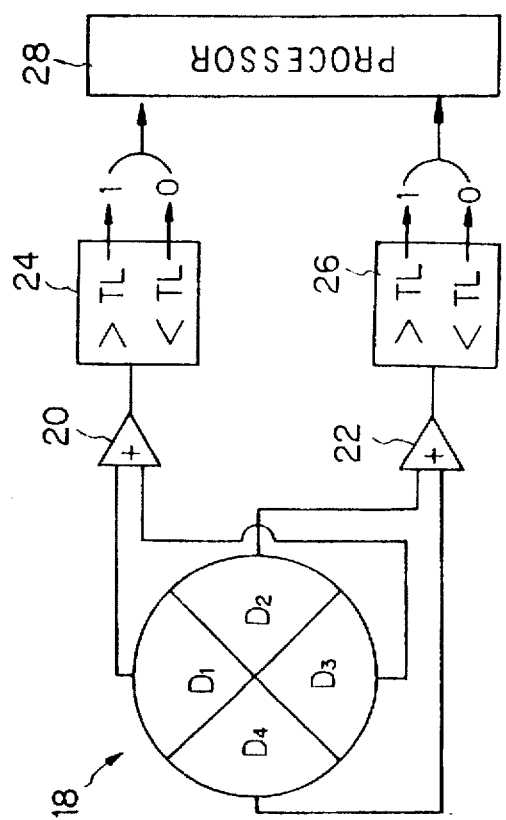
FIG. 9 is a block diagram illustrating a configuration of a photodetector and elements around the photodetector.

FIG. 9 illustrates the configuration of the photodetector and the elements around the photodetector. As shown in FIG. 9, the photodetector 18 includes four detecting elements $D_1$ to $D_4$ which convert the received light into the electric detection signal, respectively. Here, it is assumed that the order of the diffracted light in the circumferential direction of the optical disk is represented by "x", that the order of the diffracted light in the radial direction of the optical disk is represented by "y", and that the diffracted light detected by the detecting element is represented by (x, y). The detecting element $D_1$ detects the diffracted light of (0, 1)-order diffracted by an edge of the information pit in the radial direction, and the detecting element $D_2$ detects the diffracted light of (1, 0)-order diffracted by an edge of the information pit in the circumferential direction. Similarly, the detecting element $D_3$ detects the diffracted light of (0, −1)-order diffracted by the other edge of the information pit in the radial direction, and the detecting element $D_4$ detects the diffracted light of (−1, 0)-order diffracted by the other edge of the information pit in the circumferential direction. The detection signal of the detecting element $D_1$ is supplied to one input terminal of the additional amplifier 20 and the detection signal of the detecting element $D_3$ is supplied to the other input terminal of the additional amplifier 20. Similarly, the detection signal of the detecting element $D_2$ is supplied to one input terminal of the additional amplifier 22 and the detection signal of the detecting element $D_4$ is supplied to the other input terminal of the additional amplifier 22. Each of the additional amplifiers 20 and 22 adds the detection signals to output a sum signal. The comparator 24 compares the sum signal from the additional amplifier 20 with a predetermined threshold level $TL_1$ and the comparator 26 compares the sum signal from the additional amplifier 22 with a predetermined threshold level $TL_2$. It is noted that the threshold values $TL_1$ and $TL_2$ approximately equal to each other. The comparison result signals ("0" or "1") produced by the comparators 24 and 26 are supplied to the processor 28.

Figure 5:
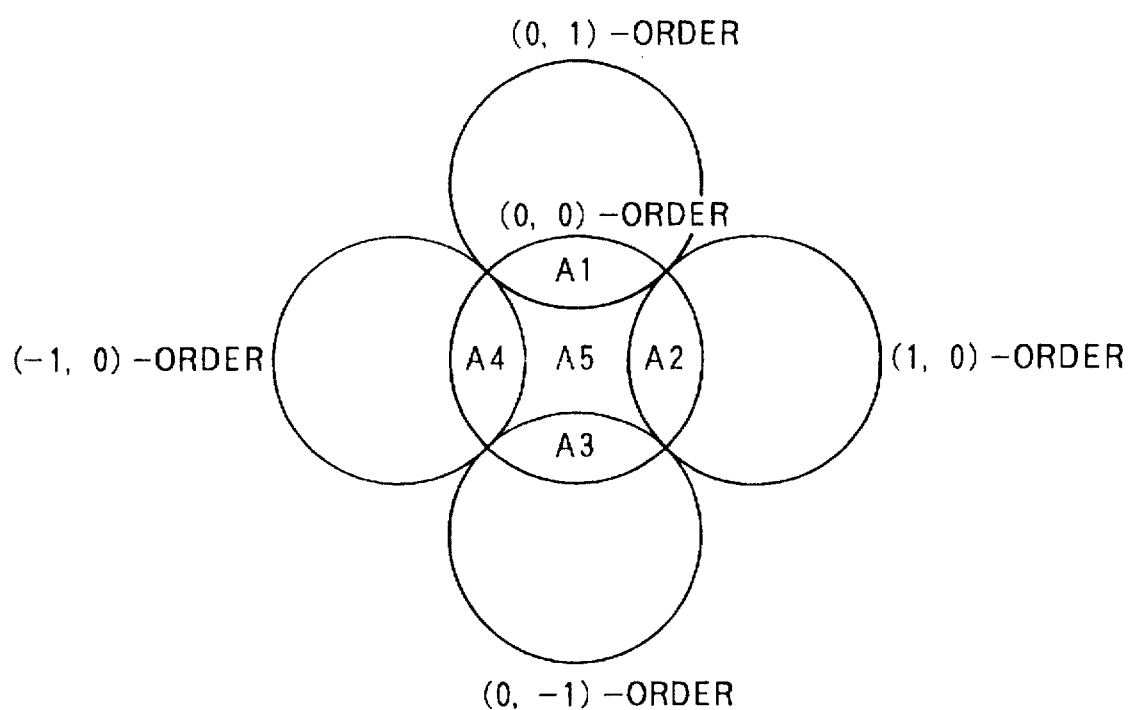
FIG. 5 is a schematic diagram illustrating an intensity distribution of laser light diffracted by the information pits.

Next, the principle of the information reading will be described. The light beam reflected by the information recording surface of the optical disk includes a directly reflected light (zero-order diffracted light) and a diffracted light. As shown in FIG. 5, the first-order diffracted lights partially overlap with the directly-reflected light (zero-order light). Here, the concept disclosed in the Paper, "Diffraction theory of laser read-out systems for optical video discs", H. H. Hopkins JOSA vol. 69, No. 1, 1979, is applied to the examination of the light intensity of the reflected light. According to this theory, the-intensity distribution of the light emitted from a light emission point and reflected by a reflecting surface (i.e., the information recording surface in this embodiment) to return to the light emission point is expressed by the following equation.

$$I(x, y) = \sum_m \sum_n \sum_{m'} \sum_{n'} R(m, n) R^*(m', n') \times \quad (1)$$

$$f\left(x - \frac{m}{p}, y - \frac{n}{p}\right) f^*\left(x - \frac{m'}{p}, y - \frac{n'}{p}\right)$$

In the equation (1), "x" and "y" represent the positional deviations of the foot of the perpendicular from the light irradiation point to the light irradiation surface (i.e., information recording surface in this case). R(m, n) represents the reflection coefficient of the diffracted light which has first-order diffraction in the x-direction and n-order diffraction in the y-direction and R*(m, n) represents a complex reflection coefficient. In addition, f(x, y) represents a pupil function indicative of the magnitude distribution with respect to the pupil sphere around the light irradiation point, and f*(x, y) represents a complex pupil function. To simplify the analysis, the pupil function is expressed by:

$$f(x, y) = 1(x^2+y^2<1) = 0(x^2+y^2>1).$$

By this, the light intensities of the five areas A1 to A5 shown in FIG. 5 are obtained as follows:

A1: $I1 = R(0,0)R^*(0,0) + R(0,1)R^*(0,1) + R(0,1)R^*(0,0) + R(0,0)R^*(0,1)$

A2: $I2 = R(0,0)R^*(0,0) + R(1,0)R^*(1,0) + R(1,0)R^*(0,0) + R(0,0)R^*(1,0)$

A3: $I3 = R(0,0)R^*(0,0) + R(0,-1)R^*(0,-1) + R(0,-1)R^*(0,0) + R(0,0)R^*(0,-1)$

A4: $I4 = R(0,0)R^*(0,0) + R(-1,0)R^*(-1,0) + R(-1,0)R^*(0,0) + R(0,0)R^*(-1,0)$

A5: $I5 = R(0,0)R^*(0,0)$ (2).

Figure 6:
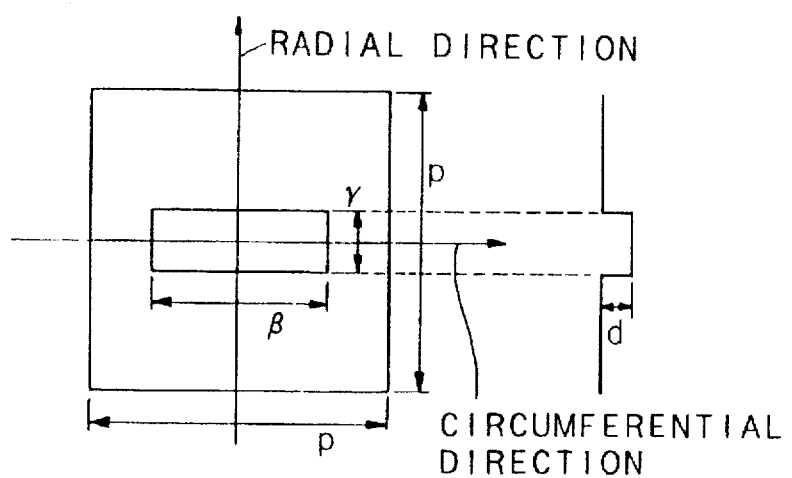
FIG. 6 is a schematic diagram illustrating a model of the information pit.

In the equation (2), the reflection coefficient R(m, n) depends upon the pit shape. The reflection coefficient calculated with respect to the model of the information pit shown in FIG. 6 is expressed as follows:

$$R(m, n) = \left[\frac{\sin(\pi m)}{\pi m}\right]\left[\frac{\sin(\pi n)}{\pi n}\right] + \quad (3)$$

$$\left[\frac{\sin\left(\pi\frac{\beta}{p}m\right)}{\pi m}\right]\left[\frac{\sin\left(\pi\frac{\gamma}{p}n\right)}{\pi n}\right]\alpha$$

$$\alpha = \left[\exp\left(\frac{i4\pi r d}{\lambda}\right) - 1\right]$$

where "r" is a refractive index of the substrate, "λ" is a wavelength of a read-out laser light, and "d" is a depth of the information pit. Therefore, the reflection coefficients for the zero-order and the first-order diffracted lights are expressed as follows:

$$R(0, 0) = 1 + \frac{\beta\gamma}{p^2}\alpha \quad (4)$$

$$R(1, 0) = R(-1, 0) = \frac{\gamma}{p}\left[\frac{\sin\left(\frac{\beta}{p}\pi\right)}{\pi}\right]\alpha$$

$$R(0, 1) = R(0, -1) = \frac{\beta}{p}\left[\frac{\sin\left(\frac{\gamma}{p}\pi\right)}{\pi}\right]\alpha$$

As a result, the light intensities of the areas A1 to A5 on the photodetector are obtained as follows:

$$A1: I1 = \left(1 + \frac{\beta\gamma}{p^2}\right)^2 \alpha\alpha^* + \frac{\beta^2}{p^2\pi^2}\left[\sin\left(\frac{\gamma}{p}\pi\right)\right]^2 \alpha\alpha^* + \quad (5)$$

$$\frac{\beta}{p\pi}\left(1 + \frac{\beta\gamma}{p^2}\right)\left[\sin\left(\frac{\gamma}{p}\pi\right)\right]\alpha\alpha^*$$

$$A2: I2 = \left(1 + \frac{\beta\gamma}{p^2}\right)^2 \alpha\alpha^* + \frac{\gamma^2}{p^2\pi^2}\left[\sin\left(\frac{\beta}{p}\pi\right)\right]^2 \alpha\alpha^* +$$

$$\frac{\gamma}{p\pi}\left(1 + \frac{\beta\gamma}{p^2}\right)\left[\sin\left(\frac{\beta}{p}\pi\right)\right]\alpha\alpha^*$$

$$A3: I3 = \left(1 + \frac{\beta\gamma}{p^2}\right)^2 \alpha\alpha^* + \frac{\beta^2}{p^2\pi^2}\left[\sin\left(\frac{\gamma}{p}\pi\right)\right]^2 \alpha\alpha^* +$$

-continued $$\frac{\beta}{p\pi}\left(1+\frac{\beta\gamma}{p^2}\right)\left[\sin\left(\frac{\gamma}{p}\pi\right)\right]\alpha\alpha^*$$

$$A4: I4 = \left(1+\frac{\beta\gamma}{p^2}\right)^2 \alpha\alpha^* + \frac{\gamma^2}{p^2\pi^2}\left[\sin\left(\frac{\beta}{p}\pi\right)\right]^2 \alpha\alpha^* +$$

$$\frac{\gamma}{p\pi}\left(1+\frac{\beta\gamma}{p^2}\right)\left[\sin\left(\frac{\beta}{p}\pi\right)\right]\alpha\alpha^*$$

$$A5: I5 = \left(1+\frac{\beta\gamma}{p^2}\right)^2 \alpha\alpha^*$$

As seen from the equations (5), the area A1 and the area A3 have equal light intensities irrespective of the shape of the information pits (i.e., irrespective of the values of γ and β), and similarly the area A2 and the area A4 have equal light intensities. The sum of the light intensities of the areas A1 and A2 differ from the sum of the light intensities of the areas A2 and A4 dependently upon the shape of the information pit.

Assuming that four different pit shapes as shown in FIG. 4A are prepared, either one of the areas A1 and A3 and either one of the areas A2 and A4 may take two different values, respectively. A predetermined threshold level TL (e.g., an average of the two values) is set to the reproduction device of the optical disk in advance and the pit judgement is performed in accordance with the rule shown in FIG. 7, thereby the device can determine the shape of the information pits. This means that four different information can be expressed by a unique information pit. In FIG. 7, the judgement rule using the intensities I1 and I2 of the areas A1 and A2 is represented as an example. In this embodiment, the device is so configured that the additional amplifier 20 calculates the sum signal of the intensities I1 and I3 of the areas A1 and A3 and the additional amplifier 22 calculates the sum signal of the intensities I2 and I4 of the areas A2 and A4, so that allowable error component included in the detected intensities and the slight positional deviation of the light spot with respect to the tracks may be absorbed.

Next, the preferable depth of the information pits will be examined. As seen from the equations (5), in order to ensure the accuracy of the pit judgement, it is preferable that the detected intensity values of the areas A1 to A4, which are dependent upon the pit shapes, have a sufficient difference. In this view, the pit depth may preferably be determined so that the value "αα*" takes a maximum value. Since the equation (6) stands:

$$\alpha\alpha^* = 2[1-\cos(4\pi rd/\lambda)] \quad (6)$$

the value αα* takes the maximum value under the following condition:

$$rd=\lambda/4\cdot(2n+1) \quad (n: \text{integer}) \quad (7)$$

Since the refractive index r of an optical disk is normally nearly equal to 1.5, the depth d of the pit may be approximated as follows:

$$d=\lambda/4\cdot(2n+1) \quad (n: \text{integer}) \quad (7a)$$

According to the above equations, if n=0, the shape of the pit becomes a concave shape having a minimum phase depth λ/4, which reflects large quantity of light. If n=−1, a pit of convex shape having phase height λ/4 is formed.

Next, the interval or pitch of the pits will be examined. The pit interval P and the track pitch P need to satisfy the condition: P>λ/(2 NA), because the information recorded as the pits cannot be read out if the ±1-order diffracted light does not impinge upon the photodetector. Here, NA represents a numerical aperture of the laser light. In practice, the interval P may preferably satisfy the equation:

$$P=\lambda/(\sqrt{2}NA) \quad (8),$$

so that the intensity difference of the detected signals can be accurately detected.

Next, the operation of the reproduction device of the optical disk will be described. In the following description, it is assumed that the information pits of four shapes shown in FIG. 4A are formed with the pit depth corresponding to the ¼ of the laser light wavelength and that the pit interval and the track pitch are determined in conformity with the equation (8). Prior to the reproduction of the recorded information, the optical disk reproduction device 100 determines the threshold TL used for the pit judgement. Preferably, the threshold TL may be an intermediate value of the maximum and minimum intensity values of the detected signals. In this view, the device 100 determines the threshold level TL in one of the following manner:

(a) rotates the optical disk for several times prior to the reproduction, and uses the D.C. level of the detected signal obtained during the rotation as the threshold value.

(b) forms special pits for the threshold determination in advance on the optical disk, and determines the threshold level using the read-out signal of the special pits. In using the above method (a), the optical disk 2 needs to satisfy such conditions that the optical disk 2 has the four pits shapes shown in FIG. 4A and that the depth of the optical disk 2 satisfies the equation (7). On the other hand, in using the method (b), the special pits for the threshold determination should be formed in addition to the above two requirements for the method (a). The special pit should have such a length and a depth that the detected signal of the special pit takes the magnitude level nearly equal to the average of the maximum and the minimum values. In the above description, the same threshold TL is used for the judgement of the pit shape in both of the radial direction and the circumferential direction. However, when the pit interval is different from the track pitch, different threshold values should be prepared. In that case, the different threshold values are set to the comparators 20 and 22. The comparators 20 and 22 retain the threshold values TL obtained by the above method (a) or (b). At the time of reproduction, the detecting elements $D_1$ and $D_3$ detect the first-order diffracted lights in the radiation direction and the additional amplifier 20 adds the detected signals from the detecting elements $D_1$ and $D_3$ which are indicative of the light intensity distribution in the radial direction. The comparator 24 compares the sum signal with the threshold level TL. Similarly, the detecting elements $D_2$ and $D_4$ detect the first-order diffracted lights in the circumferential direction and the additional amplifier 22 adds the detected signals from the detecting elements $D_2$ and $D_4$ which are indicative of the light intensity distribution in the circumferential direction (time axis direction). The comparator 26 compares the sum signal with the threshold level TL. The processor 28 judges the pit shape on the basis of the outputs of the comparators 24 and 26 according to the rule shown in FIG. 7. Specifically, it is assumed that the sum signal supplied to the comparator 24 is expressed by "u", the sum signal supplied to the comparator. 26 is expressed by "v" and the combinations of the comparison results is expressed by (u, v). The processor 28 recognizes the information pit as the square pit when (u, v)=(0, 0), recognizes the information pit as the laterally-elongated pit when (u, v)=(1, 0), recognizes the information pit as the vertically-elongated pit when (u, v)=(0, 1) and recognizes the absence of the pit when (u, v)=(1, 1). In this way, multiple information recorded in the form of an information pit are read out.

According to the optical disk of the invention, a unique pit can express four different information, i.e., information of two bits. Under the conditions that the wavelength $\lambda=780$ [nm] and the numerical aperture NA=0.45, the recording density of the optical disk according to the invention is as follows:

Recording density=2 bits×$(\sqrt{2}NA/\lambda)^2$=1.33 [Mbits/mm²].

As a result, the optical disk of the invention has a storage capacity at least 30% larger than the conventional type optical disk having an identical track pitch. A compact disk on the market has a recording density 1 [Mbits/mm²]. As described above, according to the invention, the recording density may be improved more than 30%. In addition, the reproduction device may employ the four-divided photodetector of known type, and the polarization plate and the beam-splitter may be omitted in comparison with the conventional type reproduction device, thereby the manufacturing cost per bits may be remarkably reduced.

Figure 10:
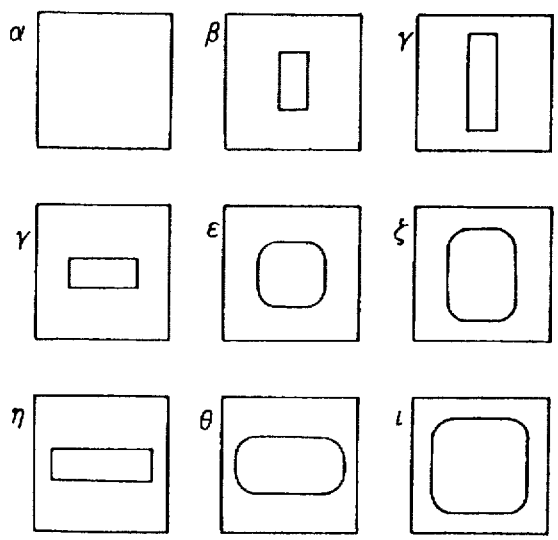
FIG. 10A is a schematic diagram illustrating shapes of nine information pits each corresponding to different information.
FIG. 10B is a diagram illustrating a rule used for a judgement of shapes of the information pits shown in FIG. 10A.

The present invention may be modified in other various forms. Specifically, more than four pit shapes may be introduced. For example, as shown in FIG. 10A, nine different pit shapes may be used. In this modification, the comparators need to compare the detected signals with two different thresholds in order to discriminate the nine pit shapes. With the judgement rule using two thresholds $TL_1$ and $TL_2$, as shown in FIG. 10B, the reproduction device can recognize nine different pit shapes. As a result, a single pit can express information of three bits, the recording density may be further improved. In the similar manner, by introducing more pit shapes and performing an accurate pit shape judgement using more than three thresholds, the information recording ability of a single pit may be further improved. In this invention, information pits to be formed are not limited to the shapes as described above. Namely, various pit shapes capable of diffracting the laser light and producing the diffracted light may be employed. In this view, this invention is applicable to a phase-change type optical disk and magnetooptical disk.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical disk comprising:

an information recording surface on which a laser light is irradiated; and information pits arranged on said information recording surface and comprising a plurality of shapes each corresponding to information to be recorded, each of said shapes having different lengths in at least one of a radial direction of the disk and a circumferential direction of the disk and a depth d substantially satisfying the following relationship with a wavelength $\lambda$ of the laser light:

$d=(2n+1)\cdot\lambda/4$ (n: integer).

2. An optical disk according to claim 1, wherein said shapes comprise a square shape, a shape elongated in the radial direction and a shape elongated in the circumferential direction.

3. An optical disk according to claim 2, wherein said shapes comprises a plain surface portion where no protruding shape is formed.

4. A reproducing device for reproducing information recorded from an optical disk, wherein the optical disk comprising:

an information recording surface on which a laser light is irradiated; and information pits arranged on said information recording surface and comprising a plurality of shapes each corresponding to information to be recorded, each of said shapes having different length in at least one of a radial direction of the disk and a depth d substantially satisfying the following relationship with a wavelength $\lambda$ of the laser light:

$d=(2n+1)\cdot\lambda/4$ (n: integer);

said reproducing device comprising:

a laser light irradiating means for irradiating the laser light on the information recording surface;

a first detecting means for receiving a light reflected by the information recording surface and for detecting an intensity of a first-order diffracted light component diffracted in the circumferential direction to produce a first detection signal;

a first comparing means for comparing the first detection signal with at least one threshold value;

a second detecting means for receiving the light reflected by the information recording surface and for detecting an intensity of a first-order diffracted light component diffracted in the radial direction to produce a second detection signal;

a second comparing means for comparing the second detection signal with at least one threshold value; and a determining means for determining information recorded on the optical disk on the basis of comparison results of the first comparing means and the second comparing means.

5. A device according to claim 4, wherein said determining means comprises a means for judging the shapes of information pits on the basis of the comparison results and a means for determining the information on the basis of the shapes of the information pits.

6. A device according to claim 5, wherein said determining means further comprises a means for storing correspondences between the shapes of the information pits and the information.

7. A device according to claim 4, wherein said first detecting means comprises a pair of detecting elements arranged oppositely to each other in the circumferential direction, and said second detecting means comprises a pair of detecting elements arranged oppositely to each other in the radial direction.

* * * * *